N. Hallock,
Fruit Basket.
Nº 21,415. Patented Sep. 7, 1858.
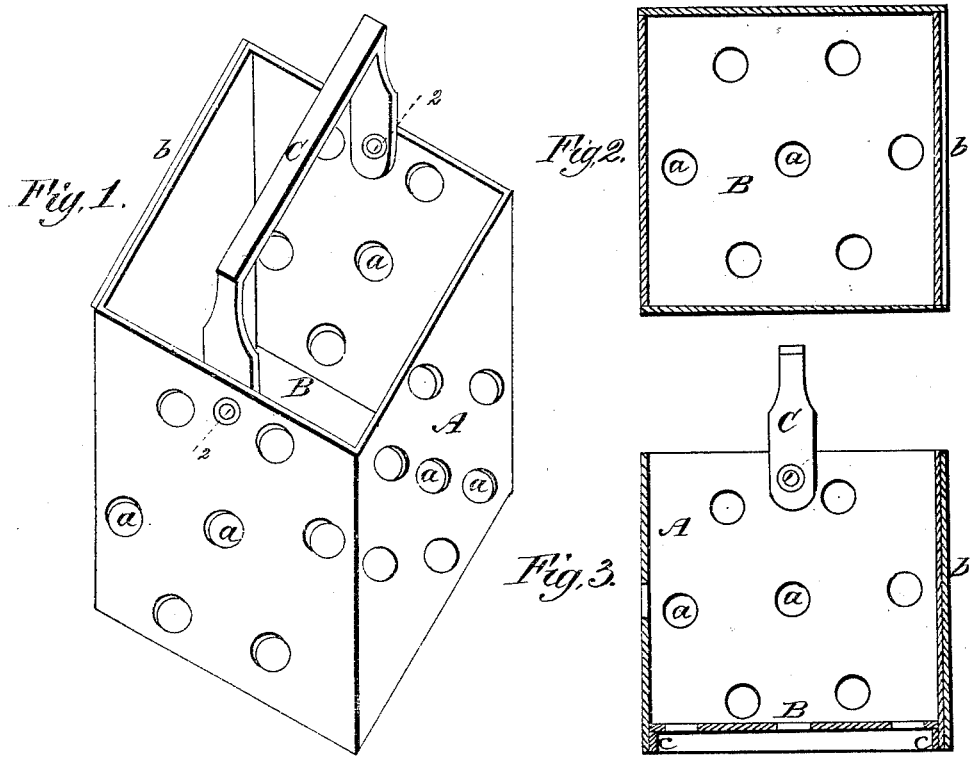

UNITED STATES PATENT OFFICE.

NICHOLAS HALLOCK, OF FLUSHING, NEW YORK.

IMPROVED FRUIT-BOX.

Specification forming part of Letters Patent No. 21,415, dated September 7, 1858.

*To all whom it may concern:*

Be it known that I, NICHOLAS HALLOCK, of Flushing, Queens county, State of New York, have invented a new and Improved Fruit-Box for all kinds of Berries and Fine Fruit; and I do hereby declare the following to be a full, clear, and exact description thereof, reference being had to the accompanying drawings, figures, and letters of reference thereon, making part of this specification.

Of the said drawings, Figure 1 is a perspective view of my improved box. Fig. 2 is a horizontal section. Fig. 3 is a vertical section.

Similar letters of reference indicate like parts in all the drawings.

The ordinary manner of packing fruit is in small baskets, with no means of ventilation but the small interstices made by the interlacing of the strands forming the basket, which has been found wholly inadequate for the proper ventilation and preservation of the fruit packed therein, while the basket-handles formed a serious inconvenience as to space, the handle usually occupying more room or bulk than the basket. These baskets are also quite expensive, costing about fifty dollars per thousand for the ordinary kind used in the packing and sale of strawberries, whortleberries, blackberries, &c.

The nature and object of my invention is to obviate all these objections and make a fruit-box capable of proper ventilation for the preservation of fruit, adapting it so as to insure the greatest economy as to space or bulk, and rendering the box strong and cheap, costing only about one-fifth that of baskets.

To this end, and to enable others skilled in the art to make and use my invention, I will proceed to describe its construction and operation.

A represents the sides of the box, formed of a continuous piece of wood, lapped and tacked or glued together at $b$.

B is the bottom of the box, the edges being doubled down and secured by packing or gluing, as shown at $c\ c$ in Fig. 3. My object in thus arranging and fastening the bottom is to impart strength thereto, and to leave sufficient space so that when layers of the boxes are packed for transportation the bottom of one box shall not rest upon or disturb the contents of the one below it, and also to assist in ventilation. Upon three sides of the box, and also the bottom, are perforations $a\ a$, of the proper size, in order to admit the air for ventilation, and consequently preservation of the fruit.

The handle C is secured to the box by means of ordinary eyelets 1 2, as shown, and is made of such dimension as to fit and fold itself within the box for the economy of space. The doubled or fastened side of the box is left without perforations, for the purpose of marking the names of the parties and their proper trade-marks, which is usually done.

I claim—

Constructing a fruit-box consisting of two sheets of material, one of which forms the body of the box, the other the bottom, being ventilated as described, and combining therewith the folding handle, substantially as set forth, and for the purposes specified.

NICHOLAS HALLOCK. [L. S.]

Witnesses:
C. A. DINGIUS,
D. G. ROWLANDS.